United States Patent [19]

Elsner

[11] Patent Number: 5,224,789

[45] Date of Patent: Jul. 6, 1993

[54] CLAMPABLE FORM-FIT COUPLING

[75] Inventor: Ernst Elsner, Herbrechtingen, Fed. Rep. of Germany

[73] Assignee: J.M. Voith GmbH, Heidenheim, Fed. Rep. of Germany

[21] Appl. No.: 827,405

[22] Filed: Jan. 29, 1992

[30] Foreign Application Priority Data

Jan. 31, 1991 [DE] Fed. Rep. of Germany ....... 4102848

[51] Int. Cl.⁵ .............................................. F16D 9/00
[52] U.S. Cl. ........................................ 403/5; 403/15
[58] Field of Search ..................................... 403/5, 15

[56] References Cited

U.S. PATENT DOCUMENTS

| | | | |
|---|---|---|---|
| 4,166,366 | 9/1979 | Okuda | 64/17 |
| 4,264,229 | 4/1981 | Falk et al. | 403/15 X |
| 4,351,549 | 9/1982 | Williams et al. | 403/15 X |
| 5,051,018 | 9/1991 | Appell et al. | 403/5 |

FOREIGN PATENT DOCUMENTS 1221054 7/1959 Fed. Rep. of Germany .
3939600 11/1989 Fed. Rep. of Germany .

Primary Examiner—Andrew V. Kundrat
Attorney, Agent, or Firm—Baker & Daniels

[57] ABSTRACT

The invention concerns a coupling for the detachable connection of two components, preferably a shaft with a hub, which for transmission of a torque are rotatably connected with each other by form-fit. When using such plug or form fit connections such as between a roll journal and a coupling box in a rolling mill, large tolerances must be expected that express themselves in peripheral directions and have adverse effects on the surface integrity of the rolled material. The invention provides for a clamping element which preferably can be inserted in the hub, acted upon by hydraulic fluid to keep the shaft in place relative to the hub. The clamping element is of a two-part design and can be filled with hydraulic fluid through appropriate devices, so that the hub is tightly fastened on the shaft upon assembly. For removal of the hub from the shaft, the pressure in the clamping element is simply relieved.

5 Claims, 1 Drawing Sheet

CLAMPABLE FORM-FIT COUPLING

BACKGROUND OF THE INVENTION

The invention concerns a coupling for the detachable connection of two components which are rotatably connected with each other by a form-fit for transmitting a torque.

Couplings of this type are especially used in heavy machinery construction with heavily stressed mechanical shaft-hub connections, for instance, in connecting a jointed shaft with a coupling box on the journal of a roll in a rolling mill. Such a coupling is known from DE-PS 27 34 048 (U.S. Pat. No. 4,166,366). It shows a journal on the end of which an essentially cylindrical coupling box is slipped on as a hub. The form closure between the journal and the coupling box is fashioned as a spade connection, namely as a flattened zone on the shaft end with an equally shaped design within the coupling box. Such a plug connection is uncomplicated, insensitive to kerfing and fracture. The plug connection is also reliable, inexpensive to produce and nonproblematic to assembly, which is especially important in case of frequent roll change.

A disadvantage is that this coupling is prone to have play, which in operation results in the edges wearing down at the transition between the circular shaft part and the flats on the shaft and in the box. As a result, the play in a peripheral direction increases while periodic pulsing in the drive has an unfavorable effect on the surface quality of the rolled material. It has been tried though to mutually fasten the coupling box and the shaft end using clamping bolts. But these clamping bolts come loose, due to dynamic stress present in a rolling mill. Keys driven in the end side or tangentially have not proved themselves either, since again they are dynamically stressed and hard to manage in roll changes.

The problem underlying the invention consists in improving the nonpositive connection between a hub, respectively a roll box and a roll journal, in such a way as to enable both a playless operation and a simple assembly.

SUMMARY OF THE INVENTION

The problem is solved with the clamping element of the present invention. Proposed is a clamping element which mutually tightens the shaft end and the coupling box, i.e., the hub. This clamping element is preferably actuated by hydraulic fluid with the pressure in the clamping element being permanently active. The hub installed on the shaft end, normally with play during operation, can thus not perform any relative rotation brought about by play in a peripheral direction. Wear of the form-fit connection is reduced and the formation of friction corrosion is precluded. At the same time, the hub with the normally following jointed shaft is axially fixed on the shaft end. The clamping element between the hub and the shaft end is not dynamically stressed. The pressure built up in the clamping element ensures a constant prestress. Thus, a detachable friction fit connection is superimposed, or arranged parallel, on the form-fit for torque transmission, which is prone to play, thereby achieving zero backlash. Due to the playless connection between the drive shaft and the hub and the roll itself, a quality improvement of the rolled material can be expected.

In one form of the invention, the clamping element is arranged on the hub and respectively the roll coupling box. The clamping element of the invention acts radially on an outer surface on the shaft journal, preferably on the cylindrical part of it.

In another form of the invention, the clamping element may be of a two-part design with an intervening pressure chamber. The clamping element may preferably be round, with an outer and an inner part which are connected with each other pressure-tight, the outer part may feature a hydraulic fluid supply and a sealing screw.

In another form of the invention, the internal part of the clamping element is fashioned thinner than the outer part, so that the inner part will elastically bear radially inwardly on the shaft surface, for the purpose of possessing the same crowning as the shaft itself. The clamping element may be inserted in an appropriate bore in the hub, from radially inward, and bear outwardly. The hub may be provided with two clamping elements that are arranged diametrically (opposed) to one another. This also simplifies the balancing of the drive shaft.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
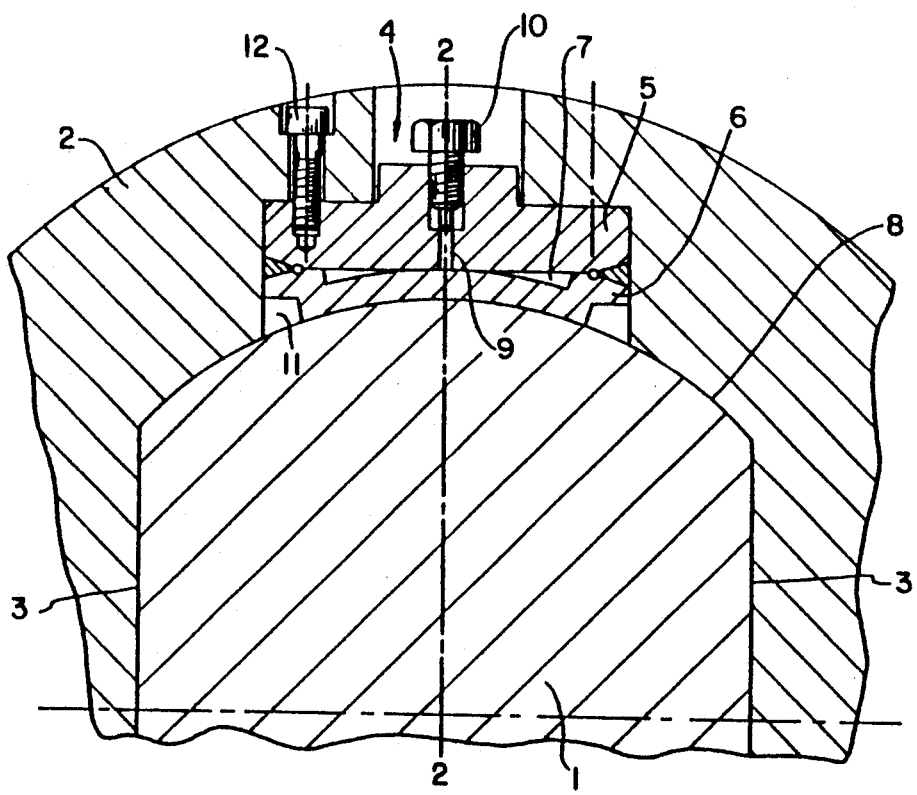
FIG. 1 shows a sectional view of a shaft-hub connection according to the invention, in the region of the clamping element.

Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DESCRIPTION OF THE PREFERRED EMBODIMENT

The coupling illustrated in FIG. 1 shows, in cross section, a shaft 1 with hub 2 surrounding it, which, especially in the case of rolling mill drives, is also called a coupling box. The shaft 1 features lateral flats 3 and the hub is identically shaped, thus creating a form-fit rotatable connection. The hub 2 features a bore 11 extending radially from inside out, in which a clamping element 4 is inserted, centered, and fastened by means of bolts 12. The clamping element 4 is comprised of an outer part 5 set back radially from the shaft surface and an inner part near the shaft surface. The outer part 5 and the inner part 6 are connected with each other through a pressure-tight weld on the periphery of the clamping element 4, which latter is of a circular design in keeping with the bore 11. Formed between the outer part 5 and the inner part 6 is a pressure chamber 7 to which hydraulic fluid can be admitted via a nipple 9 and a sealing screw 10 on the outer part 5. The inner part 6 is in contact with the surface of the shaft 1 and features the same crowning 8 as the shaft. Furthermore, the inner part 6 is fashioned considerably thinner than the outer part 5, allowing it to bear elastically on the surface of the shaft, similar to a membrane, as pressure is applied to the pressure chamber 7. In relieved condition, a small gap may remain between the inner part 6 and the shaft surface, so that the hub 2 can axially be slipped off the shaft 1.

Figure 2:
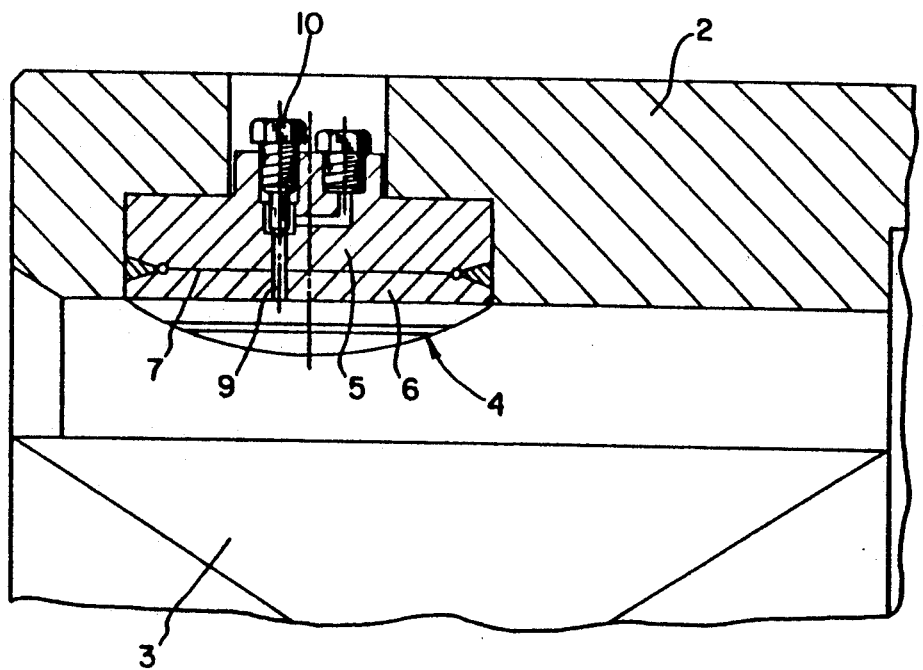
FIG. 2 shows a longitudinal sectional view along line II—II in FIG. 1.

FIG. 2 shows, in a longitudinal section, the arrangement of the clamping element 4 within the hub 2. Visible is the oil supply via the nipple 9 and the sealing screw 10 to the annular chamber 7, the later being shown in said longitudinal section only as a gap with a slight radial expanse. To increase the clamping force, two such clamping elements (not illustrated) may be arranged on the hub, diametrically opposed, whereby a symmetry may be established for balancing radial plays between the hub and shaft, which usually is an integral part of a jointed shaft. Pressurization is effected by means of hydraulic fluid via the nipple 9 with the sealing screw 10 opened. Once the required pressure has been reached, the sealing screw 10 is closed and the oil supply stopped. The clamping element thus remains under clamping force during the entire period of operation, while the sealing screw itself is not subject to any dynamic stress and will not loosen during operation. Given, thereby, is a reliable no-play connection between the shaft 1 and the hub 2 (coupling box) for the entire duration of operation.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A coupling for detachably connecting a shaft to a hub, said shaft and said hub connectable with each other both positively and nonpositively by application of a medium pressure, said hub including a stepped radial bore, said coupling comprising:

a first clamping element inserted in said stepped radial bore of said hub, said first clamping element including an interior part and an exterior part with a pressure chamber situated therebetween, said pressure chamber located between said exterior part and said interior part sealed with a sealing screw; and said interior part situated radially inside in said bore and said exterior part situated radially outside in said bore, said parts being connected with each other pressure-tight, with said pressure medium for radial expansion of said clamping element being supplied on said external part.

2. The coupling according to claim 1, wherein said shaft includes a cylindrical section and said first clamping element clamps on said cylindrical section.

3. The coupling according to claim 2, wherein said interior part includes a radially inner region adapted to the curved surface of the shaft.

4. The coupling according to claim 1 wherein said first clamping element has a circular shape corresponding to said bore.

5. The coupling according to claim 1, wherein on the hub a second clamping element is arranged diametrically opposite to said first clamping element in said hub.

* * * * *